INVENTORS
KENNETH L. THOMAS
ROBERT J. WICKHAM
GEORGE M. SKINNER
BY Barnwell R. King
ATTORNEY United States Patent Office 2,863,981
Patented Dec. 9, 1958

2,863,981

METAL ARC WELDING

Kenneth L. Thomas, Kenmore, Robert J. Wickham, Tonawanda, and George M. Skinner, Kenmore, N. Y., assignors to Union Carbide Corporation, a corporation of New York Application September 1, 1954, Serial No. 453,476

1 Claim. (Cl. 219—74)

This invention relates to gas shielded metal arc welding and more particularly to such welding according to Muller et al. 2,504,868 and Kennedy 2,532,410, which is referred to below as sigma welding.

The sigma welding process requires no flux and normally utilizes an inert gas such as argon or helium to shield a consumable metal electrode arc. These gases, however, have the disadvantage of being relatively expensive. If such inert gases could be replaced even partly with inexpensive carbon dioxide, for example, operating costs would be lowered and enable the sigma welding process to be more favorably competitive with the coated-electrode metal-arc welding process in the fabrication of carbon steels, stainless steels and nickel base alloys, for example.

The present invention is concerned with using commercially pure carbon dioxide alone or mixed with one or more other gases such as helium, argon and oxygen as the shielding gas for sigma welding such metals without the use of any flux. In addition to being less expensive, the use of carbon dioxide according to our invention produces the following advantages: Higher voltage (arc), increased welding speed, deeper penetration, and improved cross-sectional shape of the weld nugget. The welding speed has been increased in some cases as much as 100%, i. e., from 25 to 50 inches per minute by our invention. The welding area cross section has been improved for single-pass welds due to the deeper penetration.

Spatter is substantially reduced according to our invention by the use of a novel ultra-short or sunken arc technique. By ultra-short arc length we mean an arc that is substantially shorter than that known to the prior art as a short arc. Our ultra-short arc length is maintained by suitable means, preferably by a constant potential source of welding current. The effect of this novel technique is a substantial reduction of spatter and increase in penetration.

Porosity is kept to a minimum by the use of welding wire composed of deoxidized carbon steel containing residual deoxidizers. With such deoxidized wire killed steel welded according to the invention is entirely free of porosity, and porosity is minor in semi-killed steel work.

Figures 1, 2:
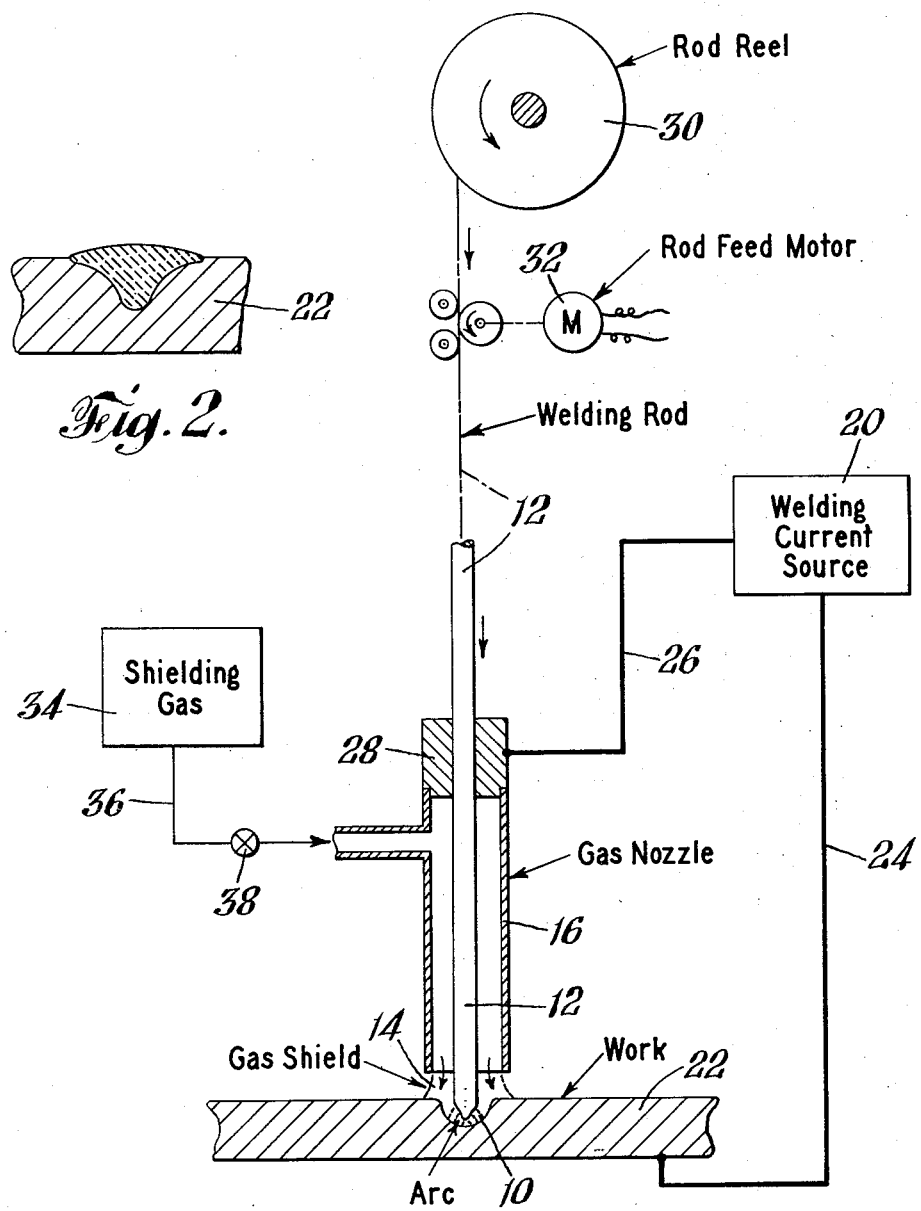
Fig. 1 is a circuit diagram illustrating the invention.
Fig. 2 is a cross-sectional view of a weld made according to the invention.

As shown, an ultra-short or sunken, deep cratered arc 10 is struck between the end of an electrode in the form of bare welding wire or rod 12 under a stream 14 of $CO_2$ gas that is discharged from a gas cup or nozzle 16, so that such gas protects the arc and adjacent metal from the air. The visible length of such arc preferably should be not more than about $1/16$ of an inch and may actually be hidden in the crater below the surface of the base plate. The arc is energized by a suitable welding current source 20 that is connected to an electrode in the form of work 22 by a lead 24, and to the rod 12 by a lead 26 and a contact tube 28. As the end of the electrode 12 is fused by the arc, such electrode is drawn from a rod reel 30 and fed toward the arc by means including a rod feed motor 32. $CO_2$ gas is supplied to the nozzle 16 from a suitable source 34 of such gas, under pressure, through a pipe 36 containing a valve 38. In the case of seam welding the arc 10 and the work 22 are moved relative to each other in the direction of the seam.

The experimental work was performed with a Linde Air Products Company FSM-1, Series 2, sigma welding machine using manually-adjusted constant rod feed rate with No. 32 CMS wire (marketed by the Linde Air Products Company, Division of Union Carbide and Carbon Corporation, and consisting of deoxidized metal composed of 0.15% C maximum, 0.25–0.35% Cr, 1.00–1.20% Mn, 0.20–0.30% Si, trace to 0.015% S, trace to 0.04% P, and the balance iron) on $1/4$-inch thick carbon steel plates. The shielding gas flow rate through a No. 12 gas cup was varied from 55–83 C. F. H. The welding conditions were established for two-pass welds; i. e., one weld bead on each side of the joint to be welded with about 60% penetration in each pass. The tests were made with beads obtained by welding on a solid workpiece. The test work was verified on actual butt welds without plate edge preparation. Most of the work was done on degreased cold finished steel strip and the rest on hot-rolled steel strip that had been descaled with acid.

According to our invention carbon dioxide may be substituted for or mixed with argon in gas shielded steel welding without impairing the physical or metallurgical properties of the weld metal. Examination of butt welds made according to our invention on $1/4$-inch low carbon steel plate showed that the tensile strength and ductility of the weld metal deposited under a shielding gas composed of 100% $CO_2$ were about equal to the usual strength and ductility of welds made with conventional argon shielding.

A large number of welds, tabulated in Table I, were made on various plain carbon steels using either a carbon dioxide or a carbon dioxide-argon atmosphere. Of the 40 welds made on killed steels of varying carbon content welded with a killed electrode, none of the welds contained porosity with carbon dioxide added to the atmosphere.

The welds made with 10 to 100% carbon dioxide show the same broadening effect produced by the addition of oxygen to argon at high current levels, as shown in Fig. 2.

TABLE I

Effect of carbon dioxide additions to argon on porosity

[No. 32 killed wire, 10 I. P. M.]

| No. of Welds | Steel | Additions | Porosity Per Inch | | |
|---|---|---|---|---|---|
| | | | $1/16$ | $1/16$ to $1/32$ | $1/32$ |
| 15 | 1035-K | 10-100 | 0 | 0 | 0 |
| 12 [1] | 1035-K | 10-100 | 0 | 0 | 0 |

[1] Welds made in chamber.

It has been believed by those in the welding industry that active shielding gases such as carbon dioxide would have adverse metallurgical effects on the composition of the weld and base metals. It was for this reason that carbon steel, has heretofore, been among the metals for which inert gases such as argon and helium were used for sigma consumable-electrode welding. (In "heliarc" welding the inert gas is used to protect the tungsten electrode as well as the puddle.) According to our invention, however, 100% carbon dioxide shielding gas can be used for many common steel welding applications without deleterious effects. Analysis of the weld metal established that little change in carbon content occurred during welding and that the reduction in silicon and manganese content of the base metal was slight. This is shown in the following table.

TABLE II

*Effect of carbon dioxide shielding on weld metal composition*

|  | Analysis (Wt.-Percent) | | |
| --- | --- | --- | --- |
|  | C | Si | Mn |
| No. 32 CMS Wire | 0.15 | 0.25 | 1.10 |
| HR Steel Base Plate | 0.17 | 0.014 | 0.49 |
| CR Steel Base Plate | 0.18 | 0.086 | 0.80 |
| Weld with 100% CO₂ Shielding on HR Plate | 0.15 | 0.048 | 0.48 |
| Weld with 100% CO₂ Shielding on CR Plate | 0.17 | 0.082 | 0.76 |

The above work was done using a DCRP power source. However, this invention is not limited to reverse polarity, since straight polarity as well as alternating current may be used.

The following example illustrates our invention in practice.

A Linde Air Products FSM-1, sigma machine using No. 32 CMS wire (1/16-inch diameter) was set up to use 55 C. F. H. carbon dioxide through a No. 12 (3/4-inch diameter) gas cup. A two-pass weld was made on 1/4-inch thick cold-rolled steel plate using 500 amperes at 43 volts for the first pass and 500 amperes at 43 volts for the second pass. Welding speed was 50 inches per minute for both passes. The weld was satisfactory in appearance and penetration with porosity of about 3 blowholes per 6 inches of weld.

In the sigma welding of carbon steel, according to our invention, most important limiting factor associated with the use of the higher percentage of carbon dioxide in carbon dioxide-argon mixtures is arc instability and the formation of spatter. Spatter formation apparently is directly related to the type of metal transfer obtained. A stable arc giving a spray-type of metal transfer with little or no spatter was noted for additions to argon of up to 15% $CO_2$ using the normal range of current utilized in sigma welding. The addition of 15 to 100% $CO_2$ to argon resulted in a droplet-type of metal transfer. The size of the droplets increased as the percentage of $CO_2$ increased until at 100% $CO_2$ the globules were extremely large with corresponding objectionable arc instability. The amount and the size of the spatter likewise increased with the additions of $CO_2$ above 15%. This spatter congests the shielding cup and limits the operation of the torch to approximately two minutes arc time before the ring of spatter must be removed. Arc instability makes difficult the uniform deposition of metal.

On technique for reducing the degree of spatter and arc instability associated with high percentages of $CO_2$ involves utilization of our novel extremely short arc length (approximately 1/16-inch). Such short arc length is preferably maintained by the use of a constant potential power source such as that disclosed by the Kennedy patent referred to above. The use of constant potential power increases the stability of ultra-short arcs. The criticality of arc length maintenance is inversely proportional to the length of the arc used for welding. This not only reduces the amount of spatter but apparently changes the phenomenon of its formation. The short-arc technique, which is preferably used at high welding speeds (150 I. P. M.) on steel gives a "sparkler" type of spatter which apparently oxidizes readily and does not congest the cup or appreciably deposit on the base metal. Such short-arc technique permits the usage of 100% $CO_2$ atmospheres without the deleterious effects of spatter.

The maximum percentage addition of $CO_2$ which can be tolerated is generally limited by the deoxidation practice employed in the manufacture of the base metal and the electrode. The oxygen level in the base plate and electrode will add to the oxygen obtained from the breakdown of the $CO_2$ to cause the formation of excessive porosity. The recommended content of $CO_2$ using No. 32 CMS wire with argon is limited to approximately 10% for rimmed steel, 50% for semi-killed steel, and 100% for killed steel before excessive porosity results. Any lesser additions for the respective steels will decrease or eliminate the normal amount of porosity present when argon or sigma grade M-5 argon is used. It has been conjectured that the CO which is a product of the partial decomposition of $CO_2$ under the influence of the arc creates a partial pressure above the weld metal which according to the law of mass action causes the following reaction to reverse: $FeO+C=Fe+CO$, thereby preventing the formation of CO in the weld metal which is the basic cause of porosity. Thus, if the $CO_2$ addition does not exceed the restrictions imposed by the oxygen content of the weld metal, the usual porosity will be reduced or eliminated.

The utilization of from 15 to 50% $CO_2$ gave gross porosity with rimmed steels using 32 CMS wire, but gave normal or a lesser degree of porosity with semi-killed and killed grades. Good welds, porosity-wise, were obtained only in killed steels with additions to argon of from 50 to 100% $CO_2$. An increasing addition of $CO_2$ above 15% gave increasingly more and larger spatter, slightly rougher surfaces, wider welds with the same penetration, and greater tendency to form small slag deposits on the surface.

Carbon dioxide has been successfully used according to the invention in commercial applications. An atmosphere of 100% $CO_2$ is being utilized on steel car frames welded by the sigma process at 150 I. P. M. using the short-arc technique. These welds are slightly undercut but they meet the standards required by the manufacturer.

The term bare electrode or wire as used herein includes those containing a so-called wash coating.

Although we prefer according to our invention to use commercially pure carbon dioxide for economic reasons additions of various other gases may be made without adversely affecting the advantages and in some instances with real benefit. Gases such as the inert gases argon and helium or even oxygen which can be added even up to 50% are of this class. For example, mixtures of $CO_2$ and 5% $O_2$, 10% $O_2$ 20% $O_2$ and even 50% $O_2$ were successfully employed according to our invention for welding killed steels.

We claim:

Sigma welding low carbon steel in an annular stream of carbon dioxide gas with a bare deoxidized metal electrode containing residual deoxidizers that is composed of 0.12–.15% C, 0.25–0.35% Cr, 1.00–1.20% Mn, 0.20–0.30% Si, trace to 0.015% S, trace to 0.04% P, and the balance iron.

References Cited in the file of this patent

UNITED STATES PATENTS

| 1,468,937 | Armstrong | Sept. 25, 1923 |
| 1,501,266 | Brace | July 15, 1924 |
| 1,589,017 | Lincoln | June 15, 1926 |
| 2,239,465 | Nepoti | Apr. 22, 1941 |
| 2,504,867 | Muller | Apr. 18, 1950 |
| 2,504,868 | Muller | Apr. 18, 1950 |
| 2,576,793 | Jordan | Nov. 27, 1951 |
| 2,621,278 | Muller | Dec. 9, 1952 |

FOREIGN PATENTS

| 527,009 | Belgium | Sept. 6, 1954 |
| 736,241 | Great Britain | Sept. 7, 1955 |

OTHER REFERENCES

Crater Formation in Arc Welding by Doan and Young, in Welding Research Supplement, October 1938, pp. 61–67.